(12) United States Patent
Nagaya et al.

(10) Patent No.: US 6,620,274 B1
(45) Date of Patent: Sep. 16, 2003

(54) METHOD OF REPAIRING ALUMINUM HEAT EXCHANGER

(75) Inventors: Takahiko Nagaya, Gifu (JP); Sunao Fukuda, Handa (JP); Yoshifumi Suzuki, Handa (JP)

(73) Assignee: Denso Corporation, Kariya (JP)

( * ) Notice: Subject to any disclaimer, the term of this patent is extended or adjusted under 35 U.S.C. 154(b) by 219 days.

(21) Appl. No.: 09/639,974

(22) Filed: Aug. 16, 2000

(30) Foreign Application Priority Data

Sep. 17, 1999 (JP) .......................................... 11-262956

(51) Int. Cl.⁷ .............................................. B32B 35/00
(52) U.S. Cl. ...................... 156/94; 156/196; 29/890.31; 29/402.01
(58) Field of Search ........................... 156/94, 98, 196; 29/890.031, 402.01, 402.03, 402.06, 402.18, 402.05, 402.04, 897.1; 165/76, 79

(56) References Cited

U.S. PATENT DOCUMENTS

| | | | | |
|---|---|---|---|---|
| 2,120,525 A | * | 6/1938 | McKerihan | 29/890.031 |
| 3,134,705 A | * | 5/1964 | Moeller | 156/197 |
| 4,859,491 A | * | 8/1989 | Yan | 156/94 |
| 5,662,162 A | * | 9/1997 | Fukuoka et al. | 165/149 |

FOREIGN PATENT DOCUMENTS

JP          U-62-118980          7/1987

* cited by examiner

*Primary Examiner*—Sam Chuan Yao
*Assistant Examiner*—Gladys Corcoran
(74) *Attorney, Agent, or Firm*—Harness, Dickey & Pierce, PLC

(57) ABSTRACT

A partly damaged aluminum heat exchanger such as an aluminum radiator is repaired by closing a hole in the damaged portion with an acrylic resin adhesive material. A certain area around the damaged portion is pressed down to form a cup-shaped depressed portion. The adhesive material is supplied to the depressed portion so that it is retained therein. Then, the adhesive material is hardened by curing it under the room temperature. The hardened adhesive material completely closes the hole with a sufficient thickness and strength because it is retained in the depressed portion. The adhesive material is cured in a relatively short time because the acrylic resin is used as the adhesive material.

5 Claims, 4 Drawing Sheets

METHOD OF REPAIRING ALUMINUM HEAT EXCHANGER

CROSS-REFERENCE TO RELATED APPLICATION

This application is based upon and claims benefit of priority of Japanese Patent Application No. Hei-11-262956 filed on Sep. 17, 1999, the content of which is incorporated herein by reference.

BACKGROUND OF THE INVENTION

1. Field of the Invention

The present invention relates to a method of repairing a heat exchanger, such as a radiator for cooling an internal combustion engine, a condenser for an automobile airconditioner, or a heater core, and more particularly to a method of closing a hole in a damaged portion of an aluminum heat exchanger.

2. Description of Related Art

Aluminum heat exchangers are getting predominantly used in recent automobiles in place of copper heat exchangers. The copper heat exchangers can be repaired by soldering with a gas burner or the like, but the aluminum heat exchangers cannot be repaired by such a manner because the melting point of aluminum is low. Accordingly, a hole formed in a damaged aluminum heat exchanger core is usually repaired by closing the hole with an epoxy-resin-type adhesive material.

However, it takes a considerably long time to repair the damaged core with the epoxy-resin-type adhesive material because a long time, e.g., two or three hours, is required to cure the epoxy resin under the room temperature. The time required for curing the epoxy resin can be shortened if a high temperature oven is used. In this case, however, it is necessary to provide a costly high temperature oven for the repairing purpose.

Further, the conventional repair work has not been sufficiently complete because the aluminum heat exchanger is repaired under a method as shown in FIGS. 4A and 4B. That is, the epoxy-resin-type adhesive material 101 is directly coated on a damaged aluminum tube 102 to close a hole 103 formed therein, and then the adhesive material is cured. Therefore, the adhesive material flows over the vicinity of the hole 103, thereby making the coated layer thin. The hole 103 is not completely closed, or the once coated adhesive material tends to be peeled off in a short time.

SUMMARY OF THE INVENTION

The present invention has been made in view of the above-mentioned problems, and an object of the present invention is to provide an improved method of repairing the aluminum heat exchanger, and more particularly to provide such a method under which a quality repair work is performed in a short time without using a costly high temperature oven.

When an aluminum heat exchanger such as an aluminum radiator is damaged for some reason and liquid coolant contained therein leaks out from a damaged portion, the damaged portion is repaired under the method according to the present invention. The radiator is composed of upper and lower tanks, plural tubes connecting both tanks and corrugated fins disposed between neighboring tubes. All of those components are made of an aluminum alloy and brazed in a furnace to connect all the components into a single unit. When such a radiator is damaged, a hole is formed through a wall of the tube, and the coolant leaks out form the hole.

A certain area around the damaged portion including the hole is pressed down to form a cup-shaped depressed portion. The size of the depressed portion is made sufficiently large, preferably with the diameter of 2–20 times the size of the hole and with the depth of 1–8 mm. The depressed portion is degreased, washed and dried, and then an adhesive material composed of acrylic resin and a hardener is supplied to the depressed portion. The adhesive material retained in the depressed portion is cured for about 20 minutes under the room temperature. Thus, the hole in the damage portion is closed with the hardened adhesive material.

Since the adhesive material is retained in the depressed portion while it is being cured and is partly impregnated into the corrugated fins, the adhesive material having a sufficient thickness firmly sticks to the damaged portion without being peeled off afterwards. Since the acrylic resin is used as the adhesive material, it is quickly cured under the room temperature without using a high temperature oven.

The repairing method according to the present invention is applicable not only to the aluminum radiators but to other aluminum heat exchangers such as condensers or heater cores used in automotive air-conditioners.

Other objects and features of the present invention will become more readily apparent from a better understanding of the preferred embodiment described below with reference to the following drawings.

DETAILED DESCRIPTION OF THE PREFERRED EMBODIMENT

Figure 1:
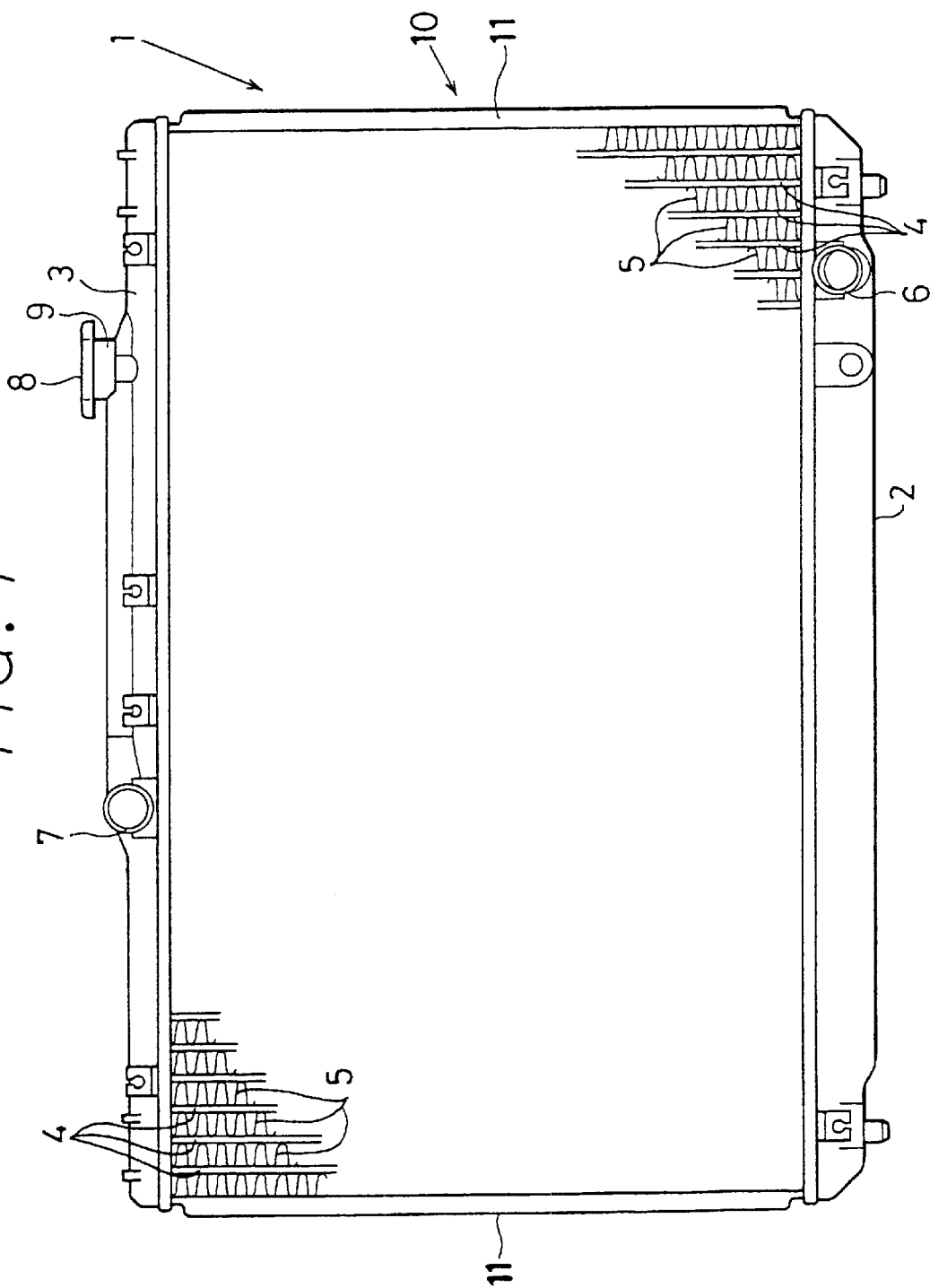
FIG. 1 is a front view showing an aluminum heat exchanger.

A preferred embodiment the present invention will be described with reference to FIGS. 1–3C. First, referring to FIG. 1, the structure of a heat exchanger to which the repairing method of the present invention is applied will be described. The aluminum heat exchanger 1 shown in FIG. 1 is used as a radiator for cooling an internal combustion engine of an automobile vehicle. The aluminum heat exchanger 1 is a conventional radiator composed of a lower tank 2, an upper tank 3 and a heat exchange core 10 having plural tubes 4 and plural corrugated fins 5. The tubes 4 connect the upper tank 3 and the lower tank 2, and the corrugated fins 5 are disposed between neighboring tubes. The tubes 4 and the corrugated fines 5 are alternately laminated and brazed together, forming the core 10.

The lower and upper tanks 2, 3 are respectively formed into an elongate cup-shape by pressing an aluminum alloy plate. An outlet pipe 6 is connected to a side of the lower tank 2, and an inlet pipe 7 is connected to a side of the upper tank 3. A supply pipe 9 for supplying additional coolant into the radiator 1 is also connected on the upper tank 3. A cap 8 having a pressure valve and a negative pressure valve is removably disposed to close an opening of the supply pipe 9.

The tube 4 having a flat-oval cross-section is formed, by presswork, from an aluminum alloy plate containing aluminum as a main component. The corrugated fin 5 is formed into a wave-shape, by roller-work, from the similar aluminum alloy plate containing aluminum as a main component. Louvers (not shown) are formed on the corrugated fin 5 for obtaining a high heat exchange efficiency.

At both sides of the core 10, side plates 11 are disposed to increase the mechanical strength of the core 10 and to serve as brackets for mounting the radiator on a vehicle. Hot coolant fed into the upper tank 3 from the engine flows down to the lower tank 2 through the tubes 4 and is supplied again to the engine. The hot coolant is cooled down in the radiator 1, while it flows down from the upper tank 3 to the lower tank 2, by exchanging heat between the coolant and cooling air flowing through the radiator in the direction perpendicular to the flat surface thereof.

Referring to FIGS. 2A–3C, a method of repairing the damaged portion of the aluminum core 10 of the heat exchanger 1 will be described. The aluminum heat exchanger 1, such as a radiator used for cooling the engine or a condenser used in the air-conditioning system, is mounted on an automobile vehicle at a place where cooling air is easily supplied thereto. Therefore, gravels or small stones rolled up by vehicle wheels may hit the aluminum core 10, and thereby the core may be damaged and a hole may be formed in the tube 4 of the aluminum core 10. The aluminum core 10 may be damaged by other causes, for example, the core may be accidentally hit with a tool while the parts in the engine compartment are being repaired.

Figure 2A:
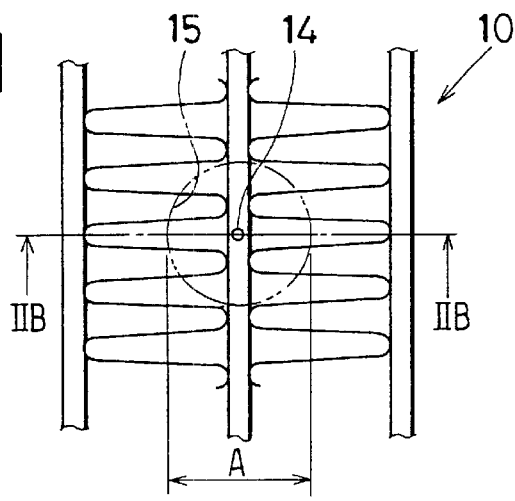
FIG. 2A is a partial front view showing a damaged portion of a heat exchanger tube and a depressed portion formed for repairing the damaged portion.
Figure 2B:
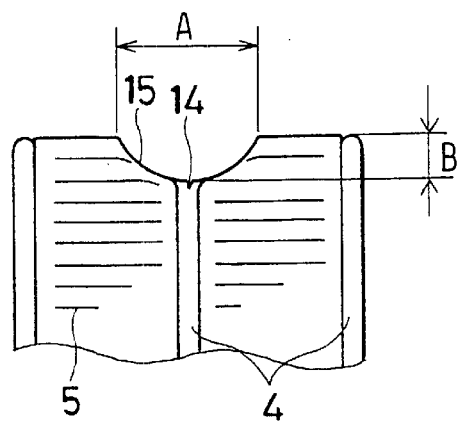
FIG. 2B is a cross-sectional view showing the depressed portion, taken along a line IIB—IIB in FIG. 2A.

When the aluminum core 10 is damaged and the coolant in the heat exchanger leaks out, the aluminum core has to be repaired. First, a portion of the core 10 around the damaged portion 14, i.e., a hole formed in the tube 4, is deformed by hitting with a hammer or the like to form a depressed portion 15, as shown in FIGS. 2A and 2B. The depressed portion 15 is formed, so that the diameter "A" thereof becomes in a range of 2–20 times the diameter of the hole 14 and the depth "B" thereof becomes in a range of 1–8 mm.

Figure 2C:
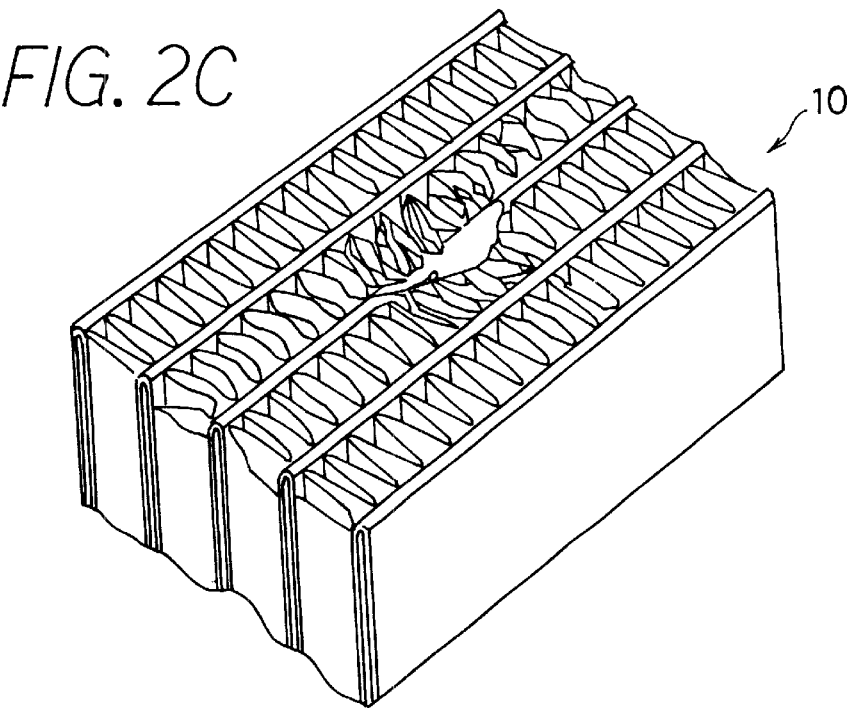
FIG. 2C is a perspective view showing the damage portion on a heat exchanger core.

A perspective view of the depressed portion 14 thus formed is shown in FIG. 2C. The aluminum corrugated fins 5 around the hole 14 are bent down and flattened to form a cup-shaped depressed portion 15. The cup-shaped depressed portion 15 is so made that the acrylic-resin-type adhesive material is retained therein while the adhesive material is being cured. The size of the depressed portion 15 has to be sufficiently large to secure a certain thickness and an adhesive surface area of the adhesive material and to prevent the adhesive material from being pealed off.

Figure 3A:
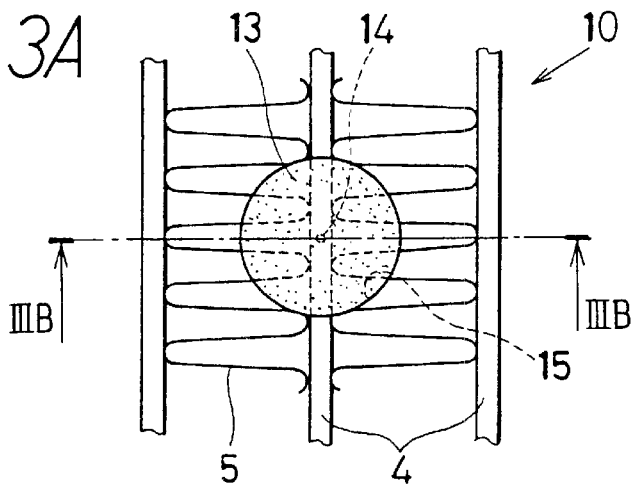
FIG. 3A is a partial front view showing a repaired portion with an adhesive material filling the depressed portion.
Figure 3B:
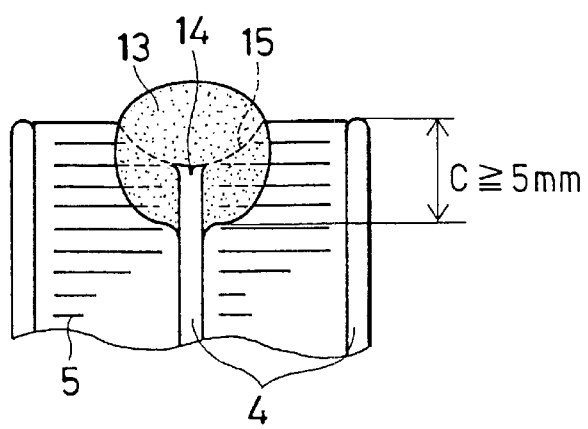
FIG. 3B is a cross-sectional view showing the repaired portion, taken along a line IIIB—IIIB in FIG. 3A.

After the depressed portion 15 is formed, the aluminum core 10 is degreased with alcohol, and then it is washed and dried under the room temperature. Then, the acrylic-resin-type adhesive material 13, which is contained in a capsule in a form of paste, is supplied to the depressed portion 15, as shown in FIGS. 3A and 3B. The supplied adhesive material 13 is retained in the depressed portion 15, and some part thereof is impregnated into the corrugated fins 5 as shown in FIG. 3B. The adhesive material 13 is supplied so that the depth "C" of the impregnation measured from the surface of the core 10 becomes deeper than, e.g., 5 mm. To supply the adhesive material 13 to the depressed portion 15, the capsule containing the adhesive material may be set to a machine for injecting the adhesive material.

Figure 3C:
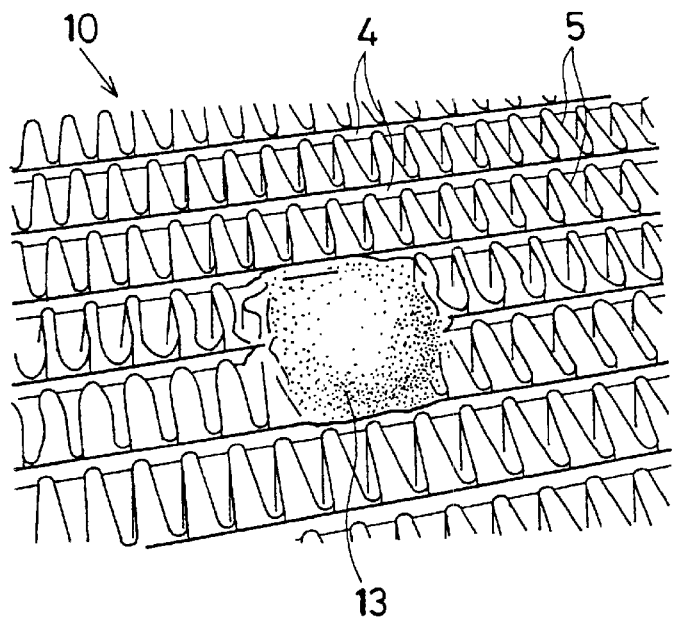
FIG. 3C is a perspective view showing the repaired portion.
Figure 4A:
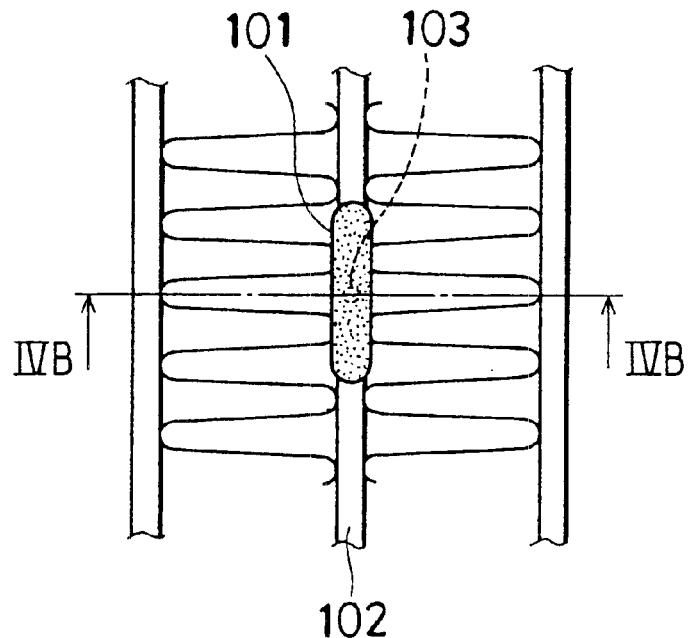
FIG. 4A is a partial front view showing a portion repaired under a conventional method.
Figure 4B:
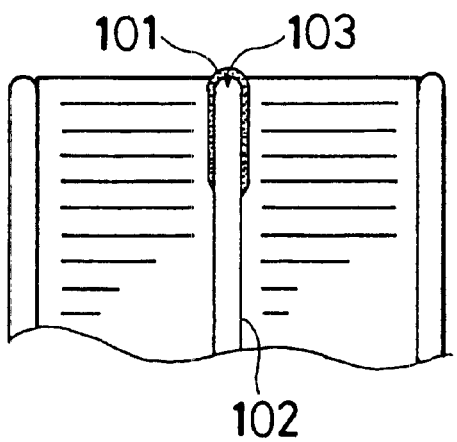
FIG. 4B is a cross-sectional view showing the conventional repaired portion, taken along a line IVB—IVB in FIG. 4A.

The adhesive material 13 retained in the depressed portion 15 and impregnated into the corrugated fins 5 is cured under the room temperature for a predetermined period, e.g., for about 20 minutes. The hardened adhesive material 13 firmly closes the hole 14, and thus the repair work is completed. The reason why the acrylic-type resin is used as the adhesive material in place of a conventional epoxy-type resin is that the acrylic resin can be hardened under the room temperature in a shorter period. The adhesive material 13 includes a hardener in addition to the acrylic-type resin as the main component. FIG. 3C shows a perspective view of the portion repaired under the above-described method.

The damaged portion of the aluminum core 10 can be repaired without removing the lower and upper tanks 2, 3 from the core 10 in the above-described manner. Alternatively, the damaged core 10 can be repaired after removing the tanks therefrom.

Since the acrylic-type resin is used as the adhesive material 13, the adhesive material is hardened in a short period of about 20 minutes under the room temperature without using a high temperature oven. Accordingly, the repair work is completed within about 30 minutes including the work for forming the depressed portion 15 around the damaged portion 14. Since the depressed portion 15 is formed before the adhesive material is supplied to the damaged portion 14, the adhesive material is retained in the depressed portion 15 while it is being cured, and accordingly a required thickness of the adhesive material is secured. Therefore, the hole 14 can be completely closed with the adhesive material. Since the adhesive material 13 is impregnated into the corrugated fins 5 around the damaged portion 14 with a certain depth, e.g., 5 mm, the adhesive material 13 is prevented from being peeled off after it is hardened. The damaged aluminum core 10 is completely repaired under the method of the present invention without causing the coolant leakage again after the repair work.

Though the repairing method of the present invention is applied to the radiator in the above embodiment, it is of course applicable to other aluminum heat exchangers including a condenser and a heater core for use in an air-conditioning system. Though one hole of the damaged portion is repaired in the above embodiment, two or more holes can be repaired in the same manner. Also, if there are plural holes close to one another, it is possible to make a depressed portion covering those holes and to repair the core in the same manner as described above.

The conventional epoxy-type resin may be usable in the repair method of the present invention though it requires a longer time or a higher temperature to cure the same. Thermosetting or thermoplastic resins other than the acrylic resin may be used in the repair method of the present invention, as long as they have characteristics suitable to the repair work.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of repairing a damaged portion of an aluminum heat exchanger, the aluminum heat exchanger comprising a core having a plurality of tubes and a plurality of corrugated fins, both the tubes and the fins being alternately laminated on one another forming the core, the core being adapted to allow cooling air to flow therethrough, the method comprising:

forming a cup-shaped depressed portion around the damaged portion by pressing down the corrugated fins; and filling the cup-shaped depressed portion and its vicinity with an adhesive material so that the adhesive material is retained within the cup-shaped depressed portion.

2. The repairing method as in claim 1, wherein:

the adhesive material is composed of acrylic resin and a hardener.

3. The repairing method as in claim 1, wherein:

the aluminum heat exchanger is an aluminum radiator for cooling an internal combustion engine.

4. The repairing method as in claim 2, wherein:

the cup-shaped depressed portion is formed with a diameter in a range of 2–20 times the damaged portion and with a depth in a range of 1–8 mm.

5. The repairing method as in claim 1, wherein:

the damaged portion is a hole formed through a wall of the tube.

* * * * *